US006653808B2

(12) United States Patent
Inagaki et al.

(10) Patent No.: US 6,653,808 B2

(45) Date of Patent: Nov. 25, 2003

(54) ELECTRIC MOTOR CONTROL DEVICE

(75) Inventors: Hiroyuki Inagaki, Aichi-ken (JP); Hiroaki Kato, Mie-ken (JP); Hideki Kuzuya, Aichi-ken (JP); Noboru Sebe, Fukuoka-ken (JP); Kenji Ikeda, Tokushima-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 80 days.

(21) Appl. No.: 10/080,583

(22) Filed: Feb. 25, 2002

(65) Prior Publication Data

US 2002/0149332 A1 Oct. 17, 2002

(30) Foreign Application Priority Data

Feb. 23, 2001 (JP) ...................................... 2001-048251

(51) Int. Cl.[7] ................................................ H02P 7/05

(52) U.S. Cl. ....................... 318/432; 318/268; 318/433; 318/701

(58) Field of Search ................................ 318/268, 432, 318/433, 609, 610, 701, 254; 388/930

(56) References Cited

U.S. PATENT DOCUMENTS 4,148,452 A * 4/1979 Niessen et al. ............. 244/195
4,214,301 A * 7/1980 Kurihara et al. .............. 700/80
5,990,645 A * 11/1999 Nakamura et al. .......... 318/432
6,037,736 A * 3/2000 Tsuruta et al. .............. 318/609
6,157,156 A * 12/2000 Tsuruta ....................... 318/609

FOREIGN PATENT DOCUMENTS

JP 07 79585 3/1995

* cited by examiner

*Primary Examiner*—Bentsu Ro
(74) *Attorney, Agent, or Firm*—Sughrue Mion, PLLC

(57) ABSTRACT

A controller K calculates a command torque by correcting the required torque w1 with a correction based on a motor rotation speed Nm, and controls an electric motor based on the command torque T. The command torque w1 is regarded as one content of an outside input W to the controller K. A difference between the rotation speed of the electric motor outputted by the actual model describing an actual response of the electric motor and another rotation speed of the electric motor outputted by a reference model describing ideal performance and vibration reduction is regarded as one content Z1 of controlled output Z from the controller K. Moreover, a characteristic variation depending on vehicle types and so on, a torque ripple, and a sensor noise are described by weight functions wm1, wm2 and wn. Then a pertubative output w2 and a sensor noise w3 are regarded as the remaining contents of the input W. An output of the weight function wm2 is regarded as the controlled output Z. The controller K is determined by solving H∞control problem that a transfer function between the outside input W and the controlled output Z is determined as an H∞norm of the transfer function to be smaller than a predetermined value.

8 Claims, 14 Drawing Sheets

24
24A
24B
24C
D1
SW2
11a
SW1
D2
D3
SW4
11b
SW3
D4
D5
SW6
11c
SW5
D6
23
C1
C2
C3
23a
23b
23c
23d
23e
23f
PH1(U)
PH1(L)
PH2(U)
PH2(L)
PH3(U)
PH3(L)
C6
C5
C4
16 controlled output Z
z1
z2
weight function wm2
motor revolution speed Nm
reference model rsys
actual plant model psys
controller K
command torque
weight function ws
weight function wm1
weight function wn
Outside input W
required torque (w1)
perturbative output (w2)
sensor noise (w3)

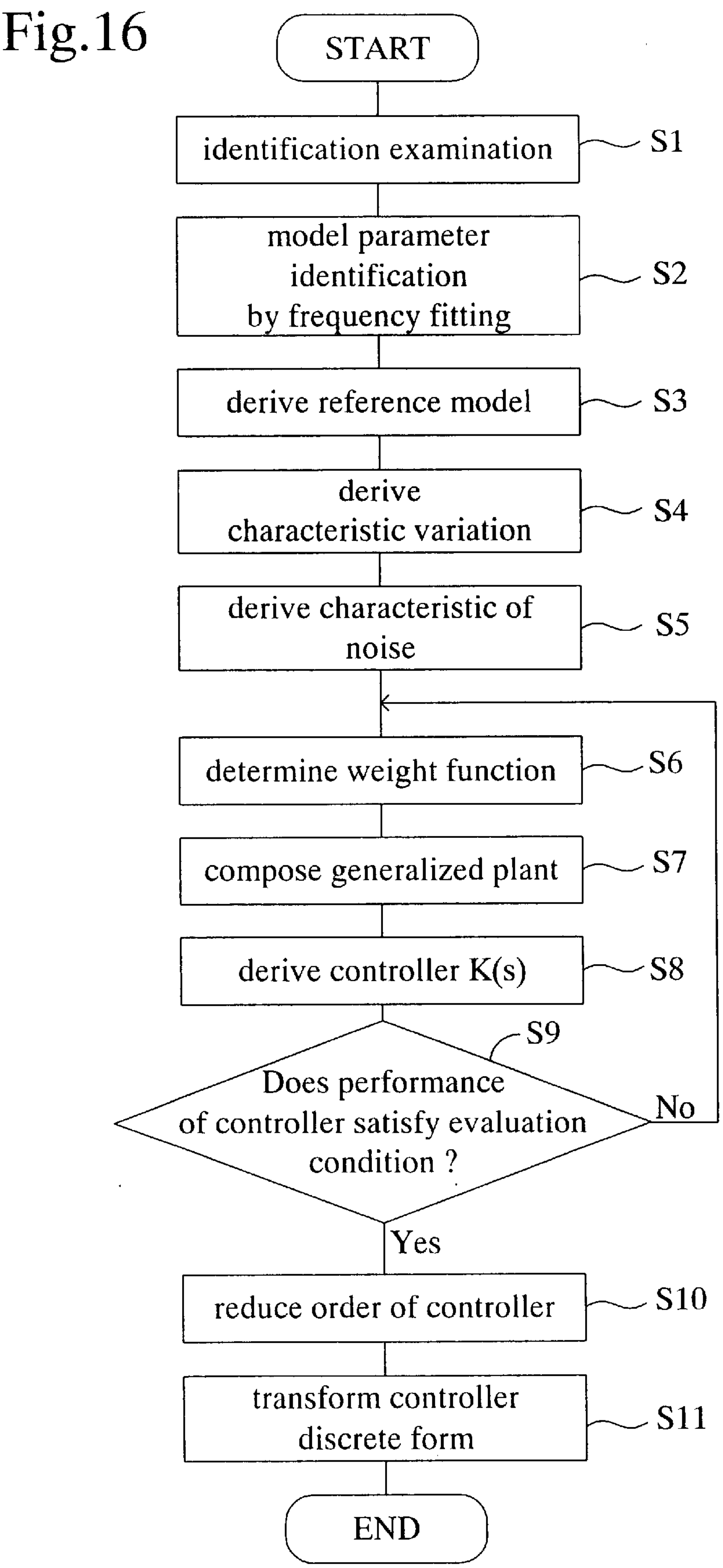
Fig.16
START
identification examination
S1
model parameter identification by frequency fitting
S2
derive reference model
S3
derive characteristic variation
S4
derive characteristic of noise
S5
determine weight function
S6
compose generalized plant
S7
derive controller K(s)
S8
S9
Does performance of controller satisfy evaluation condition ?
No
Yes
reduce order of controller
S10
transform controller discrete form
S11
END

ELECTRIC MOTOR CONTROL DEVICE

This application is based on and claims priority under 35 U.S.C. §119 with respect to Japanese Patent Application No. 2001-048251 filed on Feb. 23, 2001, the entire content of which is incorporated herein by reference.

FIELD OF THE INVENTION

This invention generally relates to an electric motor control device for controlling an electric current to be supplied to an electric motor based on H∞control theory.

BACKGROUND OF THE INVENTION

Switched reluctance motors (SR Motors) are conventionally employed as a driving source of electric vehicles. A conventional control device for controlling the switched reluctance motor is shown in FIG. 19. In the control device, a required torque reqtrq determined based on an accelerator operating amount is converted to both a current command value I and an angular command value θ based on a command value map. (The command value map is prepared to indicate a relation between an electric current supplied to the SR Motor and an angle location at a stator that the same directional electric current is supplied.) The controller further controls the amount of electric current corresponding to the current command value I and in schedule or timing corresponding to the angular command value θ, and as a result the SR Motor generates a rotational torque corresponding to the required torque reqtrq. This control system is an open-loop system as shown in FIG. 19.

The SR Motor mounted on the electric vehicle may be affected by resonance characteristics of springs used for suspension in the vehicle. The SR Motor mounted on the electric vehicle may further be affected by other resonance characteristics caused by torsional deformation of a drive shaft, tires and so on connected with the SR Motor. Especially when the required torque is quickly changed as shown in FIG. 20, a rotation speed may be pulsated. Then the pulsated rotation speed appears to be a vibration in longitudial directions of the electric vehicle body. The vibration of the vehicle body may cause discomfort to the vehicle's passengers.

To overcome the above drawback, a control method for correcting the current command value I and the angular command value θ by employing a proportional derivative control (PD control) can be useful. According to this art, the vibration of the electric vehicle body can be reduced by determining a larger proportional value and a larger derivative value.

But, if the proportional value and the derivative value are determined to be large in the above PD control, noise in the motor rotation speed, which is detected by a motor rotation speed sensor, is also amplified. Thus the vibration due to the noise may be generated in the SR Motor. Moreover, stability of the control system may be spoiled. In consideration of the noise amplification and the stability of the control system, the proportional value and the derivative value are limited in size, thus the PD control cannot reduce the vibration of the electric vehicle body as sufficiently as expected. Moreover, when attempting to reduce the vibration using the above-mentioned PD control, the gain of the control system may also be reduced in all frequency domain, thus the tracking performance of the actual torque of the electric motor relative to the required torque in the control system may be spoiled. Furthermore, the acceleration performance of the electric vehicle is reduced. The above problems may also occur to an SR Motor employed as a driving source in another mechanism other than the electric vehicle.

SUMMARY OF THE INVENTION

The object of the present invention is to provide an electric motor control device having a vibration reduction performance (the performance for reducing the vibration caused by a resonance of the electric vehicle body with the electric motor), an acceleration, a noise resistance, a robust stability, and so on that are compatible with each other at a high level.

According to a first aspect of the present invention, the electric motor control device determines a required torque in response to an operation amount for an electric motor. Then the controller, in the electric motor control device, calculates a correction amount based on an actual rotation speed of the electric motor detected by a rotation speed detecting device. Then the electric motor control device controls an electric current to be supplied to the electric motor depending on a command torque obtained by correcting the required torque with a correction amount calculated by a controller. For the electric motor control device, a reference model and an actual model have been previously prepared. The reference model indicates an ideal response of the electric motor having ideal tracking performance and vibration reduction performance relative to the required torque, and the actual model indicating an actual response of the electric motor. Then the required torque is regarded as an input amount to be input into the controller. While, a revolution speed difference is determined based on the difference between a first rotation speed, calculated by inputting the required torque to the reference model, and a second rotation speed, calculated by inputting the required torque to the actual model. The rotation speed difference is regarded as a controlled amount outputted from the controller. The controller is determined as an H∞norm of a transfer function between the input amount and the controlled amount to be smaller than a predetermined value. The electric motor control device controls the electric current to be supplied to the electric motor by using the determined controller.

In the above electric motor control device, the controller calculates the correction amount based on the actual rotation speed of the electric motor detected by the rotation speed detecting device. Then the controller corrects the required torque determined in response to the operation amount of the electric motor by the above correction amount. To obtain the controller, following processes are executed. First, the reference model and the actual model are prepared. The reference model has the ideal response of the electric motor to obtain good tracking performance and the vibration reduction performance relative to the required torque. The actual model indicates the actual response of the electric motor. Next, the required torque is regarded as the input amount to be inputted to the controller. The difference between the first rotation speed, calculated by inputting the required torque to the reference model, and the second rotation speed calculated by inputting the required torque to the actual model, is regarded as the controlled amount outputted from the controller. Then the H∞control problem is solved by determining the H∞norm of the transfer function between the input amount and the controlled amount is determined to be smaller than the predetermined value.

Thus the present invention has the following advantages. Since the above controller is mounted on the electric motor control device, the actual response of the electric motor is close to the reference model which has excellent tracking performance and vibration reduction performance. Accordingly, the electric motor can be operated with better tracking performance and vibration resistance.

According to a second aspect of the present invention, in the above electric motor control device, the controller is preferably determined based on a control system in which the required torque is inputted to both the reference model and the actual model through the first weight function.

By the above technical method, since the gain of the first weight function in a particular frequency domain is determined to be large, the response of the electric motor controlled by the controller in the same particular frequency domain is closer to the reference model.

According to a third aspect of the present invention, in the above electric motor control device, the gain of the first weight function in the low frequency domain is preferably determined to be larger than the gain in the high frequency domain.

By the above technical method, the actual response of the electric motor in the low frequency domain can be made to be closer to the reference model, thus the tracking performance of the electric motor response relative to the required torque variation can be improved.

According to a fourth aspect of the present invention, in each of the above-mentioned electric motor control devices, the gain of the reference model is preferably determined to be smaller than the gain of the actual model in a frequency domain near a resonance frequency of the actual model. The gain of the reference model is determined to be approximately equal to the gain of the actual model in the remaining frequency domain.

By determining the gain of the reference model as described, a controller (i.e. the electric motor control device) capable of suppressing the vibration of the electric motor caused by a resonance can be produced.

According to a fifth aspect of the present invention, in any one of the above electric motor control devices, the actual response variation of the electric motor is calculated by a multiplicative perturbation. First, the perturbative output outputted by the multiplicative perturbation is inputted to the actual model through the first weight function. And, a second controlled amount is outputted from the controller through a second weight function. Next, the required torque and the perturbative output are regarded as the input amount, and the rotation speed difference and the second controlled amount are set as the controlled amount. Thus the controller is determined as the H∞norm of the transfer function between the above input amount and the above controlled output to be smaller than the predetermined value. Preferably, the controller controls the electric current to be supplied to the electric motor.

According to an examination, it has been proved that transfer characteristics between the required torque and the rotation speed are varied depending on driving conditions and types of vehicles (or types of machines that the electric motor is employed as a driving source). And, it has also been proved that when electric currents supplied to the motor coils are switched at high frequencies, a torque ripple is generated, and then the torque ripple negatively influences the rotation speed.

To cope with the above drawbacks, a factor bringing the actual response variation of the electric motor is described by the multiplicative perturbation. For example, the torque ripple content is described by the second weight function, then the perturbative output is outputted by the multiplicative perturbation, and added to the command torque through the second weight function. An actual transfer characteristic variation of the electric motor, depending on the varying driving conditions and the difference of vehicle types, is described by the third weight function. Thus the actual transfer characteristic variation is obtained as the second controlled amount processed through the third weight function. By the above technical method, the controller suppressing the effect by the actual response of the electric motor caused by the torque ripple and the transfer characteristic variation caused by the varying driving conditions, i.e. the electric motor control device can be produced.

According to a sixth aspect of the present invention, in the above electric motor control device, the gain of the second weight function is preferably determined to be large in the high frequency domain, and the gain of the third weight function is determined to be large in the low frequency domain.

By the above technical method, the second weight function well describes the torque ripple being large in the high frequency domain. While, the third weight function describes the transfer characteristic variation depending on the varying diving condition being large in the low frequency domain.

The actual motor rotation speed is detected by the rotation speed detecting means. Generally, the detected rotation speed contains the sensor noise (white noise), the influence of the sensor noise to the control system has to be eliminated. Moreover, the rotation speed of the electric motor corresponds to a definite integration from a time before the predetermined time of a motor torque generated by the electric motor depending on time. Even if the rotational torque is zero, the motor rotation speed is not immediately changed to be zero but to keep a constant speed value. The constant speed value is called a steady-state component of the motor rotation speed. On the other hand, the actual model is designed to be linear near the resonance frequency. Thus, the steady-state component has to be eliminated for the control performance of the controller to be improved.

To avoid the sensor noise and the steady-state component, included in the rotation speed of the electric motor, the following process is executed. According to a seventh aspect of the present invention, first, the sensor noise and the steady-state component are described by a fourth weight function relative to the sensor noise. Next, the required torque, the perturbative output and the sensor noise are regarded as the input amount. And, the controlled amount and the second controlled amount are set as the controlled amount of the controller. The controller is preferably determined to have the H∞norm being smaller than the predetermined value. By using the controller determined as above, an electric motor control device having improved robust stability can be produced.

In the above-mentioned electric motor control device, the gain of the weight function wn in the low frequency domain is preferably determined to be larger than in the high frequency domain.

The reason why the gain of the fourth weight function is as described above is because the steady-state component of the rotation speed of the electric motor, which affects the system more than the sensor noise, becomes large in the low frequency domain. By determining the fourth weight function as described above, a controller capable of more effectively stabilizing the response of the electric motor (i.e. the electric motor control device) can be produced.

BRIEF DESCRIPTION OF THE DRAWINGS

The foregoing and additional features and characteristics of the present invention will become more apparent from the following detailed description considered with reference to accompanying drawings in which like reference numerals designate like elements and wherein:

FIG. 16 shows a flow chart indicating designing process for the controller loaded on the electric motor control device shown in FIG. 1;

DETAILED DESCRIPTION OF THE INVENTION

Figure 1:
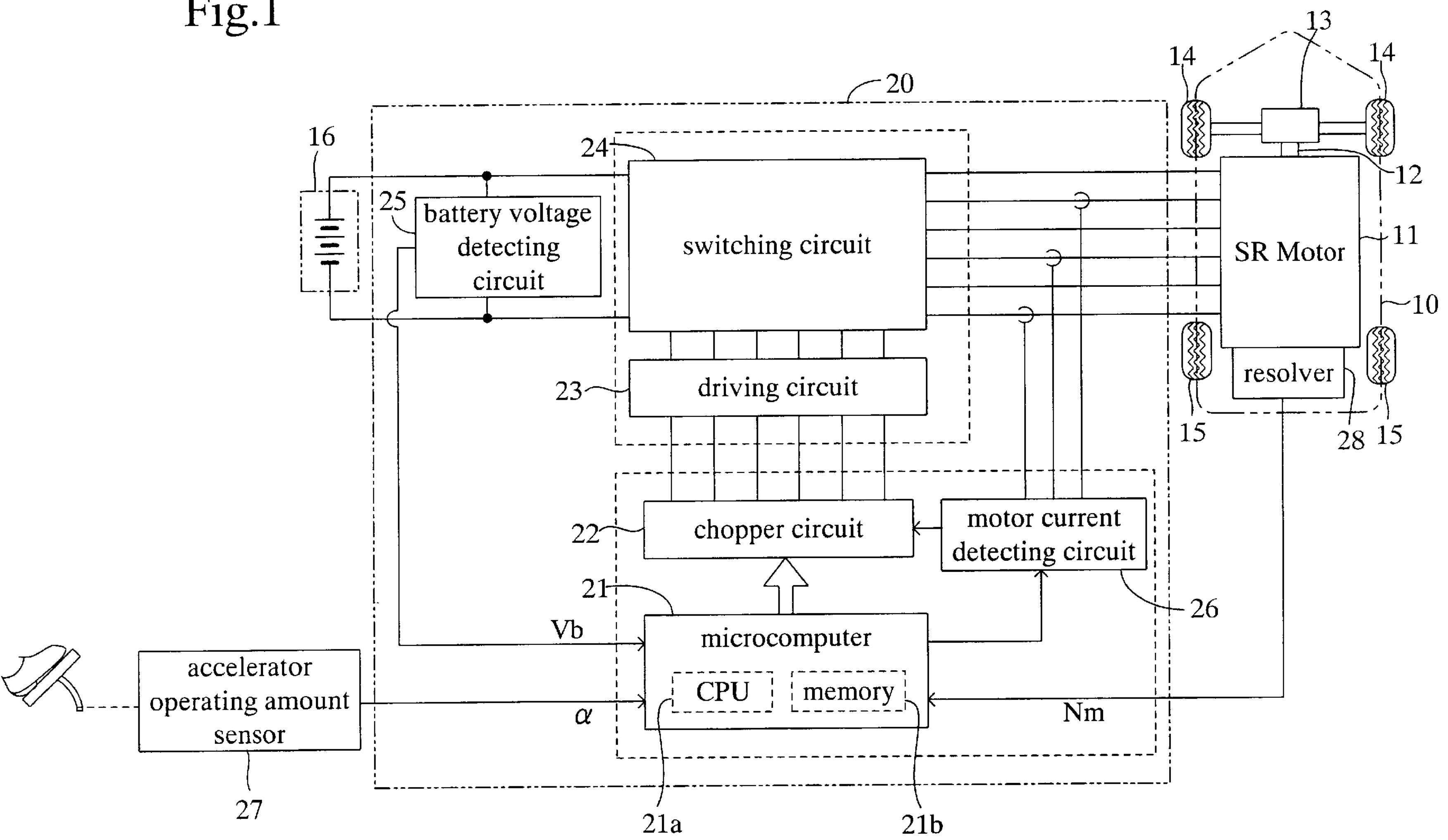
FIG. 1 shows a block diagram of a vehicle (an electric vehicle) that an electric motor control device of the present invention is mounted.

Hereinafter, an embodiment of the present invention, an electric motor control device for a switched reluctance motor SR Motor, will be described. In FIG. 1, a block diagram schematically showing a structure of an electric vehicle having the electric motor control device is shown. As shown in FIG. 1, the electric vehicle 10 has a switched reluctance motor SR Motor 11 as a driving source, a drive shaft 12, a differential gear mechanism 13, and driving wheels 14 driven by a rotational torque generated by the SR Motor 11 through the drive shaft 12, the differential gear mechanism 13, and so on. The electric vehicle 10 further has drive wheels 15, a battery unit 16, and an electric control device 20.

The SR Motor 11 is a three-phase induction motor controlled by the electric control device 20 which controls an electric supply for phases of stators, an electric current and the electric supply timing of the SR Motor 11. The battery 16 is a rechargeable battery, but the battery 16 may be a fuel cell.

The electric control device 20 has a microcomputer 21, a chopper circuit 22 electrically connected with the microcomputer 21, and a driving circuit 23 connected with the chopper circuit 22. The electric control device 20 further has a switching circuit 24 connected with the battery 16 and each phase of the SR Motor 11 together with driving circuit 23, a battery voltage detecting circuit 25 for detecting a battery voltage Vb by being connected to the both terminals of the battery 16, and a motor current detecting circuit 26 for detecting electrical currents in the connecting lines connected to the switching circuit 24 with each phase of the stators in the SR Motor 11.

The microcomputer 21 has a CPU 21*a* and a memory 21*b* connected to each other by buses (not shown). The memory 21*b* is constructed by a ROM, a RAM, and so on. The microcomputer 21 is connected with the battery voltage detecting circuit 25, an accelerator operating amount sensor 27 and a resolver 28 (rotation speed detecting means) for detecting of the rotation speed (or rotation number) Nm of the SR Motor 11. The battery voltage Vb, an accelerator operating amount α and rotation speed (revolution) Nm of the SR Motor 11 are inputted to the microcomputer 21. The CPU 21*a* executes an after-mentioned program stored in the memory 21*b* using a temporary memory function of the memory 21*b*. The memory 21*b* previously stores or memorizes a required torque map and a command value map (not shown).

Figure 3:
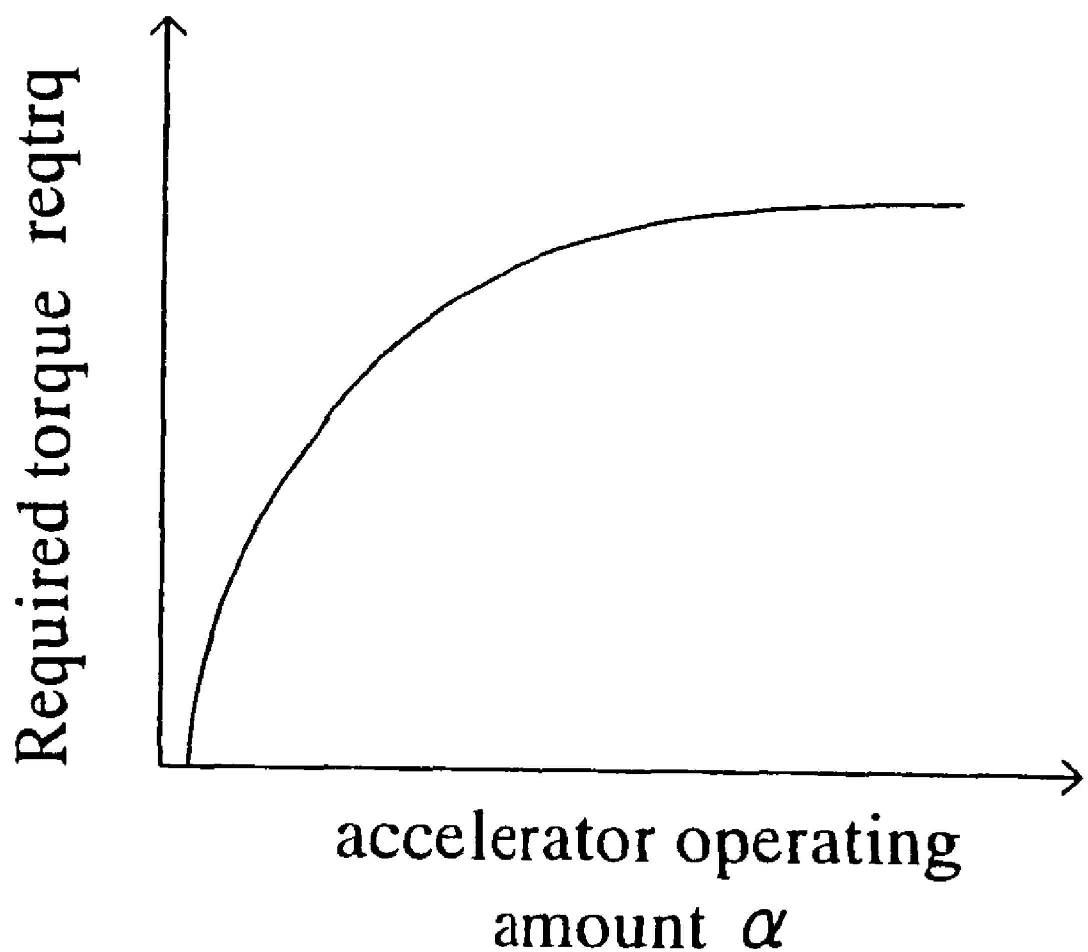
FIG. 3 shows a required torque map being referred by a CPU shown in FIG. 1.

The microcomputer 21 calculates a required torque reqtrq based on the inputted accelerator operating amount α and the required torque map shown in FIG. 3. The microcomputer 21 calculates a correction u (k) by using an after-mentioned controller K (a feed-back compensator K(s)). The microcomputer 21 corrects the required torque reqtrq with the correction u (k) already calculated, and then the microcomputer 21 finds a command torque T. The microcomputer 21 further determines a current command value I and an anglar command value θ based on the command torque T and the indicating map (not shown). The microcomputer 21 outputs a command signal composed by the current command value I and the anglar command value θ to the chopper circuit 22.

The chopper circuit 22 is constructed to send drive control signals PH1(U), PH1(L), PH2(U), PH2(L), PH3(U), and PH3(L) to the driving circuit 23 based on the command signal from the microcomputer 21 and the amount of the electric current supplied to the SR Motor 11 detected by the motor current detecting circuit 26.

Figure 2:
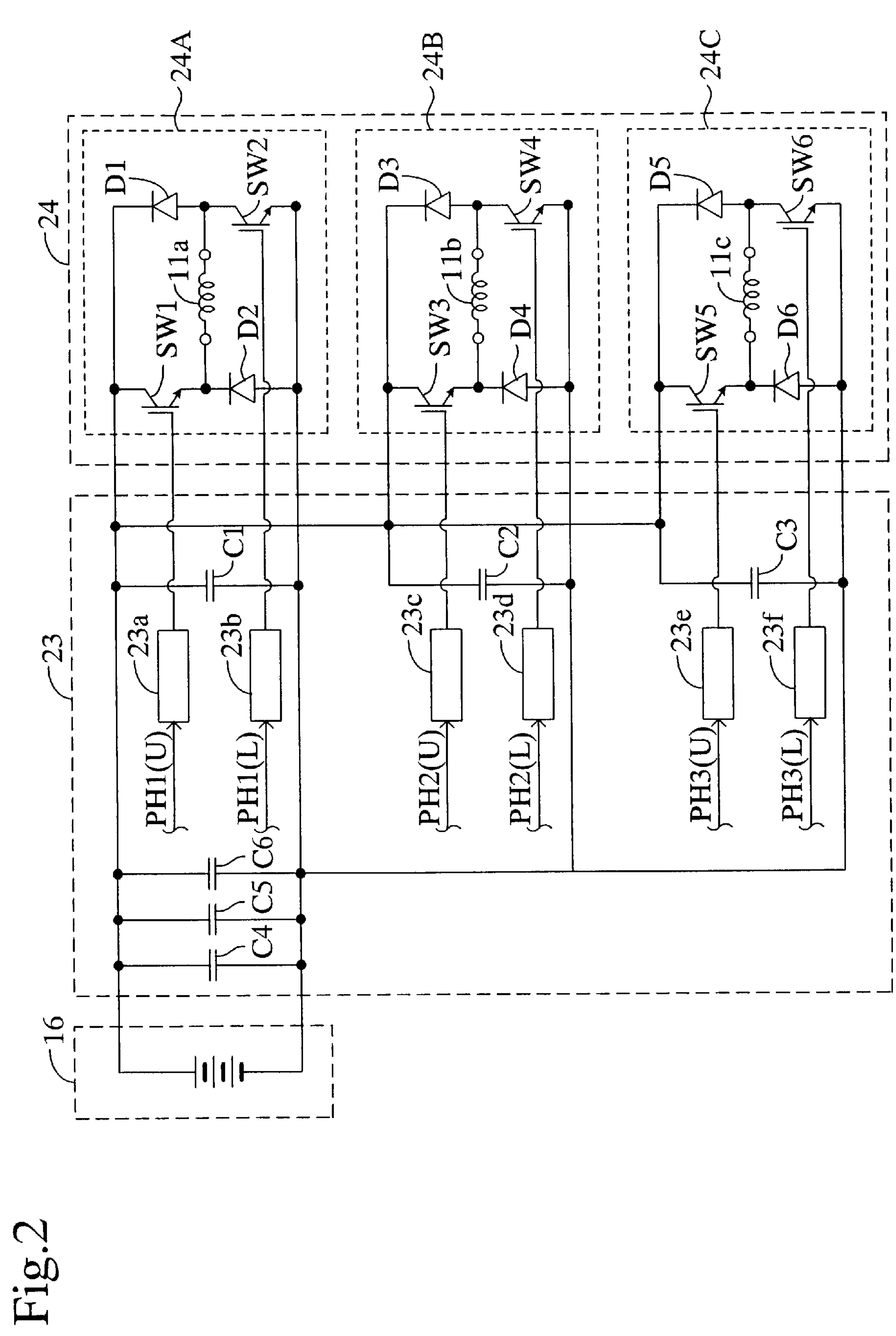
FIG. 2 shows a driving circuit and a switching circuit.

The driving circuit 23 has amplification circuits 23*a* to 23*f*, and capacitors C1 to C6 as shown in details in FIG. 2. The driving circuit 23 is constructed to send switching signals to the switching circuit 24 depending on the driving control signals PH1(U), PH1(L), PH2(U), PH2(L), PH3(U), and PH3(L).

The switching circuit 24 has switching circuits 24A, 24B and 24C as shown in detail in FIG. 2. The switching circuit 24A, 24B and 24C correspond to motor coils 11*a*, 11*b* and 11*c*, respectively. The switching circuit 24A has switching devices SW1 and SW2, and diodes D1 and D2. The switching device SW1 and SW2 are turned conductive condition from non-conductive condition and vice versa depending on the switching signals from the amplification circuits 23*a* and 23*b*, and thus the switching circuit 24A controls the electric current flowing in the motor coil 11*a*. The switching circuit 24B has switching devices SW3 and SW4, and diodes D3 and D4. The switching devices SW3 and SW4 are turned to a conductive condition from a non-conductive condition and vice versa depending on the switching signals from the amplification circuits 23*c* and 23*d*, and thus the switching circuit 24B controls the electric current flowing in the motor coil 11*b*. The switching circuit 24C has switching devices SW5 and SW6, and diodes D5 and D6. The switching device SW5 and SW6 are turned to a conductive condition from a non-conductive condition and vice versa depending on the switching signals from the amplification circuits 23*e* and 23*f*, and thus the switching circuit 24C controls the electric current flowing in the motor coil 11*c*.

Hereinafter, the controller K will be described. The controller K is designed based on H∞control theory based on a block diagram shown in FIG. 4. Each design process for the controller K will be described as follows. The H∞control problem is solved by obtaining the controller K such that an H∞norm of a transfer function Tzw describing a relation between an outside input W and a controlled output Z (‖Tzw‖∞) is smaller than a predetermined value γ(for example, 1) in a "generalized plant" having the outside input W, a controlled input U, the controlled output z, and an observed output Y as shown in FIG. 5.

In this embodiment, the controller K, bringing an actual plant model psys close to a reference model rsys, is determined or derived by resolving the H∞control problem.

First, when the SR Motor 11 is operated in an open loop system, the actual plant model psys is determined based on the actual rotation speed Nm of the SR Motor 11 corresponding to the required torque w1. In other words, the required torque w1 is inputted to the open loop system, and then the current command value I and the angular command value θ is determined based on the command value map (not shown). Based on the current command value I and the angular command value θ, the controller K actually operates or drives the SR Motor 11 through the chopper circuit 22, the driving circuit 23, and the switching circuit 24.

Next, the actual rotation speed Nm of the electric motor is measured. Based on the measured rotation speed Nm (in other words, the rotation speed Nm is the actual response of the electric motor corresponding to the required torque w1), the actual plant model psys is determined. The actual plant model psys is determined by an identifying technique, so called the model parameter identification by an identification examination and a frequency fitting.

Figure 6:
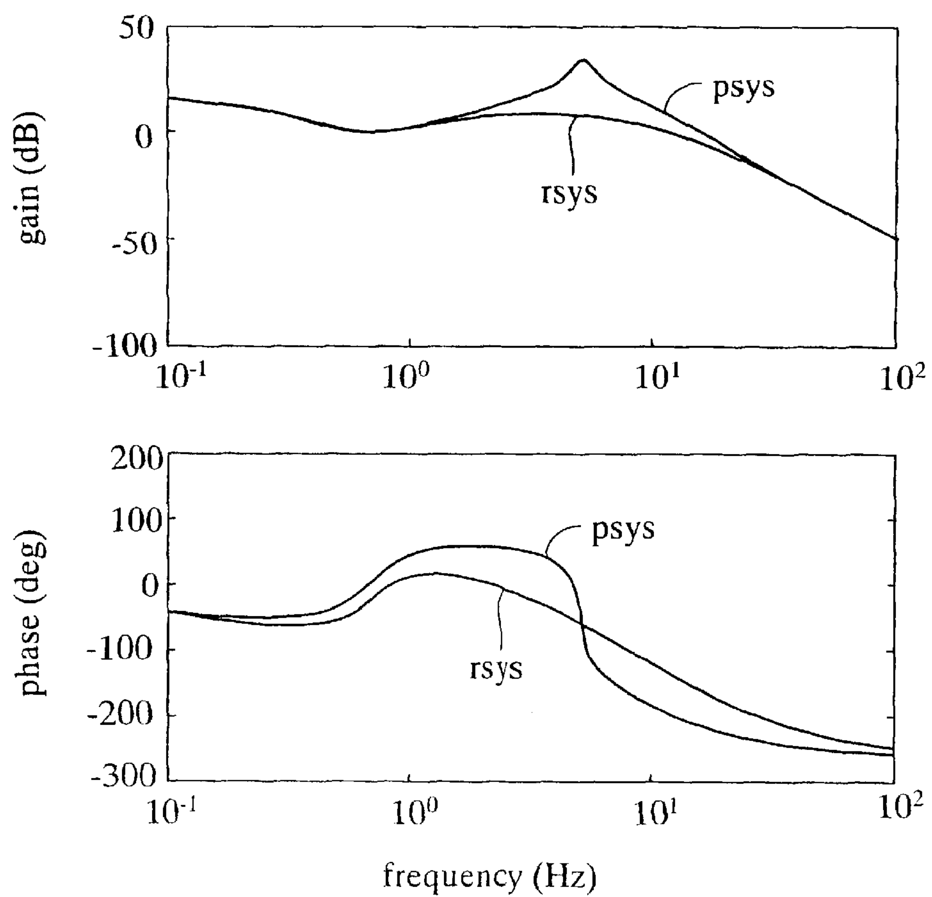
FIG. 6 shows a graph indicating gains and phase characteristics of a reference model and an actual plant model shown in FIG. 4 depending on frequency.

Referring the resulting actual plant model psys, the reference model rsys is the ideal mathematical model that a vibration reduction performance which is compatible with a responsibility depending on the varying required torque w1, is obtained. As shown in FIG. 6, the reference model rsys has a gain being much smaller than that of the actual plant model psys near the resonance frequency. But the gain of the reference model rsys is designed to be equal to the gain of the actual plant model psys.

Figure 7:
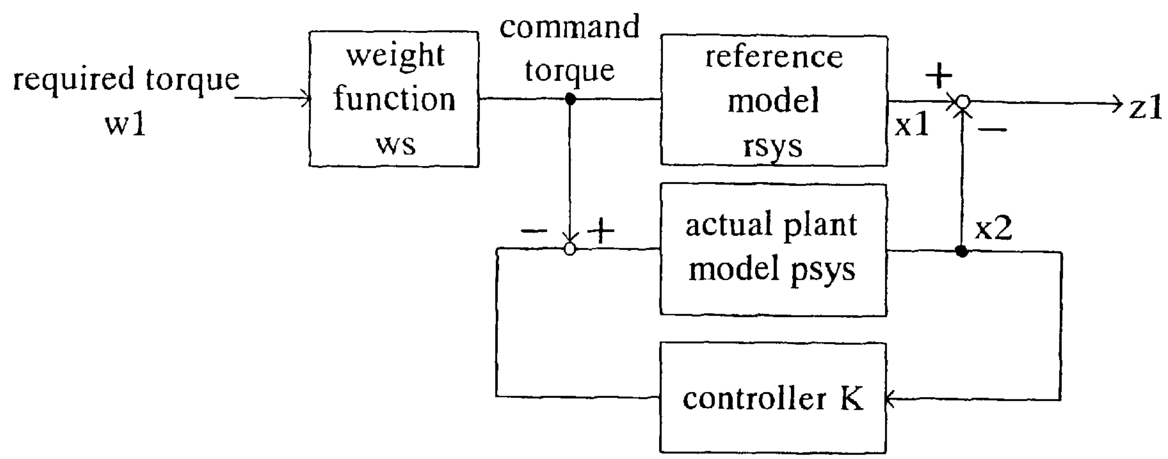
FIG. 7 shows a partial block diagram indicating connection between the actual plant model, the reference model, the controller and the weight functions in FIG. 4.

In this process, a closed loop system is formed of the actual plant model psys and a controller K as shown in FIG. 7. In the closed loop system, the actual plant model psys is connected in parallel with the reference model rsys. Moreover, the required torque w1 is converted to the command torque by the weight function ws in the closed loop system. Then the command torque is inputted into the actual plant model psys and the reference model rsys. An output X1 is outputted by the reference model rsys and an output X2 is outputted by the actual plant model psys. Thus the difference between output X1 and output X2 is obtained as the controlled output z1 as shown in FIG. 7. The problem to get the controller K to bring the response of the actual plant model psys close to the response of the reference system RSYS so that it can be resolved into the H∞control problem to find the controller K that the H∞norm of transfer function Tzw between the required torque w1 and the controlled output z1, (‖Tzw‖∞) is smaller than 1 (=γ). And by considering the H∞control problem, the vibration reduction performance and the tracking performance can be simultaneously evaluated.

Figure 8:
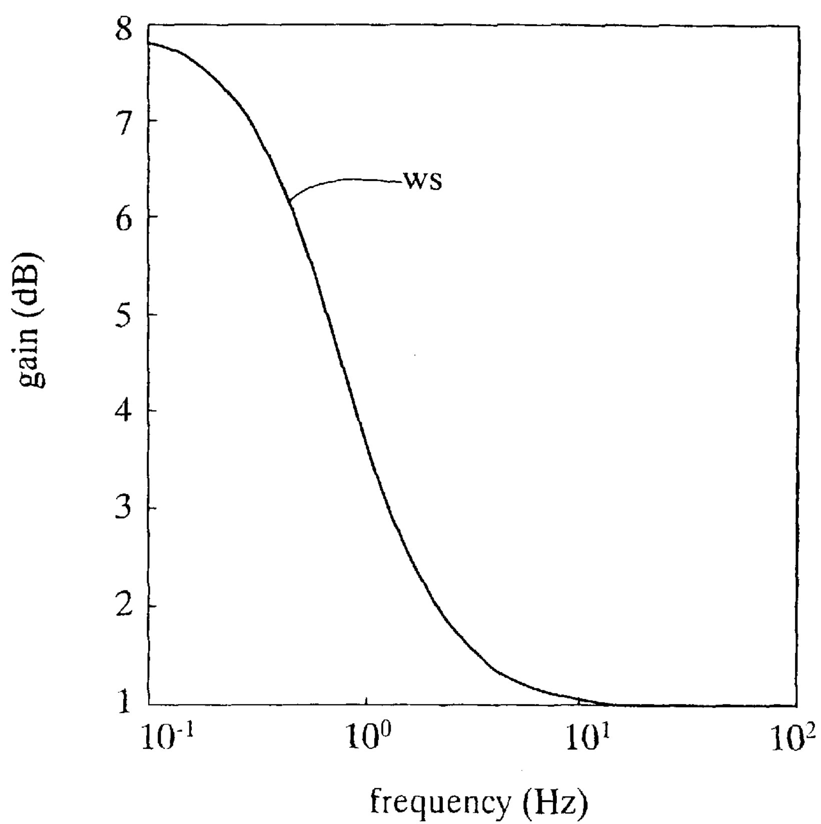
FIG. 8 shows a graph indicating the gain characteristic of the weight function ws in FIG. 7.

Furthermore, in the above closed loop system, the effect of the weight function ws is determined to be large in the particular frequency domain, and the response of the actual plant model psys becomes closer to the response of the reference model rsys. In this embodiment, as shown in FIG. 8, the gain of the weight function ws is determined to be large in a low frequency domain. By determining the gain as described above, the actual response of the closed system in the low frequency domain can be close to that of the reference model, and thus the practical tracking performance of the SR Motor 11 can be improved.

Figure 9:
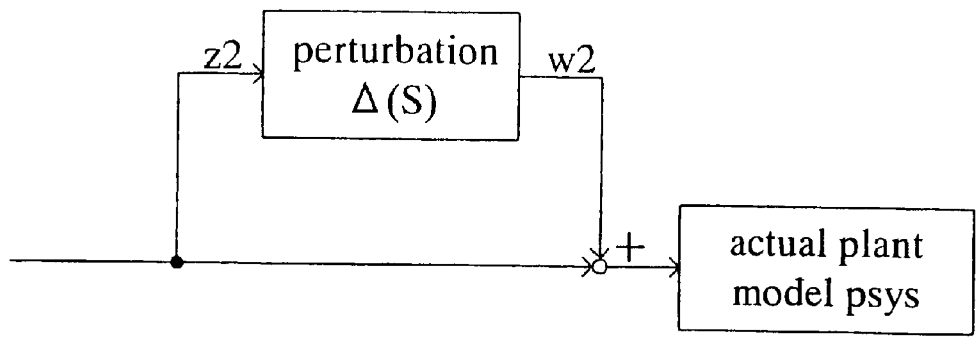
FIG. 9 shows a block diagram conceptually indicating how to treat the characteristic variation.

By the way, according to an examination, it was proved that transfer characteristics between the required torque w1 and the rotation speed Nm were varied depending on driving conditions of the electric motor and types of electric vehicles. It was also proved that when electric supply to the motor coils 11*a* to 11*c* were switched in high frequencies, a torque ripple was generated, and then the torque ripple negatively influenced the rotation speed Nm of the electric motor. To cope with the above negative influence, a factor bringing the characteristic variation to the closed loop system is regarded as a multiplicative perturbation Δ (s) as shown in FIG. 9. A controlled output z2 (in FIG. 9) is regarded as an input of the multiplicative perturbation Δ (s), and a perturbative output w2 is regarded as an output of the multiplicative perturbation Δ (s) (or an inputs to the generalized plant). Thus in the controller K, the perturbative output w2 scarcely influences the controlled output z2 can be obtained.

Figure 10:
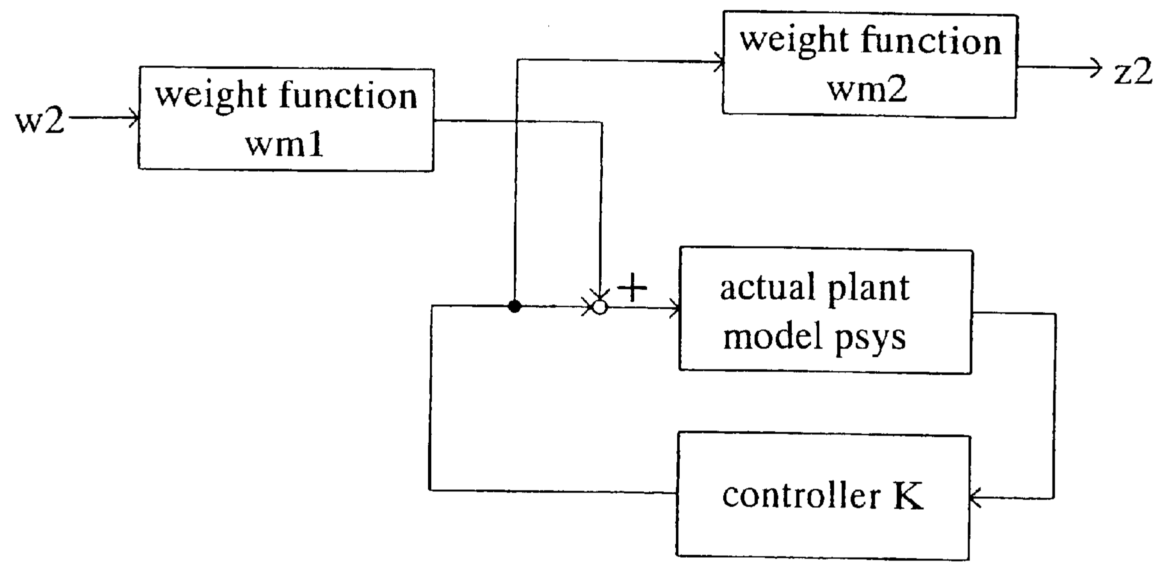
FIG. 10 shows a block diagram concretely indicating how to treat the characteristic variation in FIG. 9.
Figure 11:
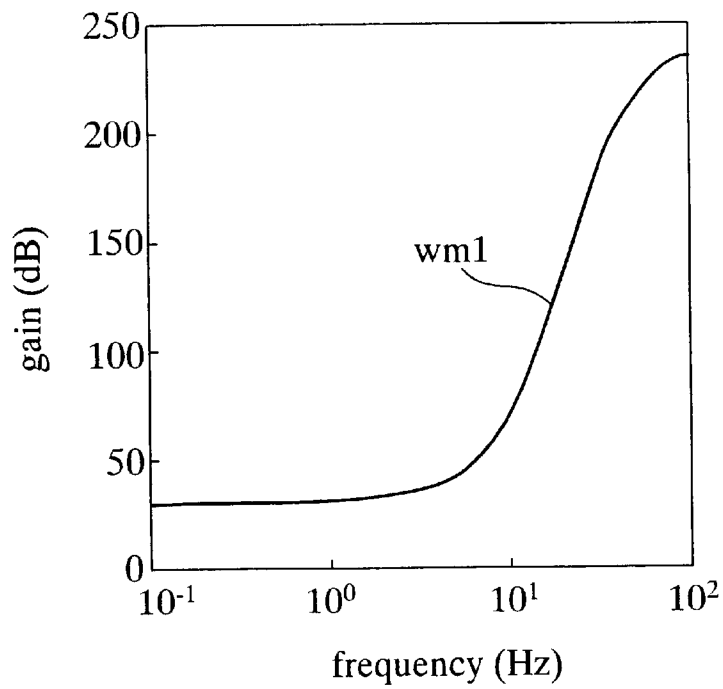
FIG. 11 shows a graph indicating a gain characteristic of a weight function wm1 shown in FIG. 10.
Figure 12:
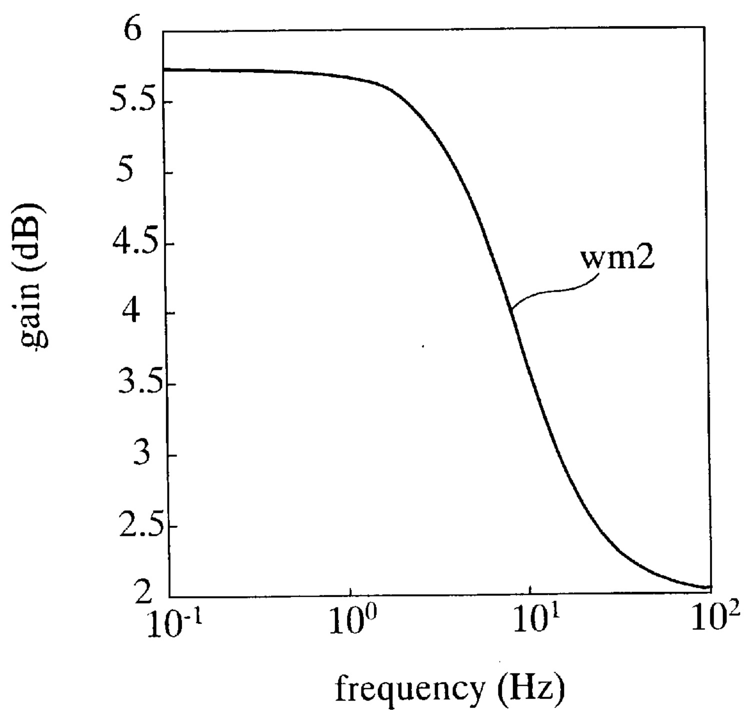
FIG. 12 shows a graph indicating a gain characteristic of a weight function wm2 shown in FIG. 10.

More concretely, as shown in FIG. 10, by adding the perturbative output w2 to the command torque through a weight function wm1, the contribution of the above-mentioned torque ripple is regarded as a disturbance to the required torque. The weight function wm1 is determined to have a gain being large in a high frequency domain as shown in FIG. 11. The above transfer characteristics variation depending on the driving conditions and the types of vehicles is described by a weight function wm2, then the controlled output z2 is outputted from the weight function wm2 in the system. The weight function wm2 is determined to have a gain being large in the low frequency domain as shown in FIG. 12. By the above determined functions, the problem of the controller K to reduce the negative effect by the torque ripple and the transfer characteristics variation can be converted as the H∞control problem.

Figure 13:
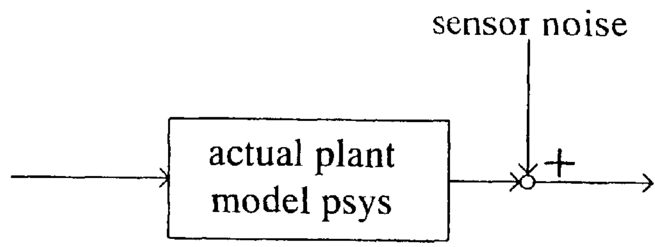
FIG. 13 shows a block diagram conceptually indicating how to treat a sensor noise.

In addition, since the actual signal indicating the motor rotation speed Nm is generated by the resolver 28, the above signal contains the sensor noise (white noise). The fashion of the above sensor noise effect to the system can be described as a block diagram shown in FIG. 13.

Figure 14:
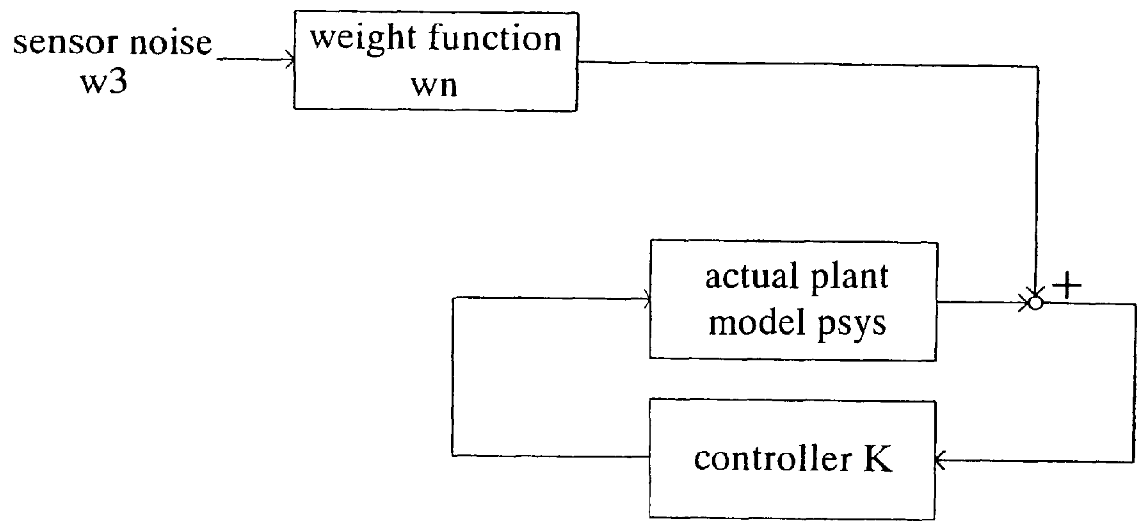
FIG. 14 shows a block diagram concretely indicating how to treat a sensor noise.
Figure 15:
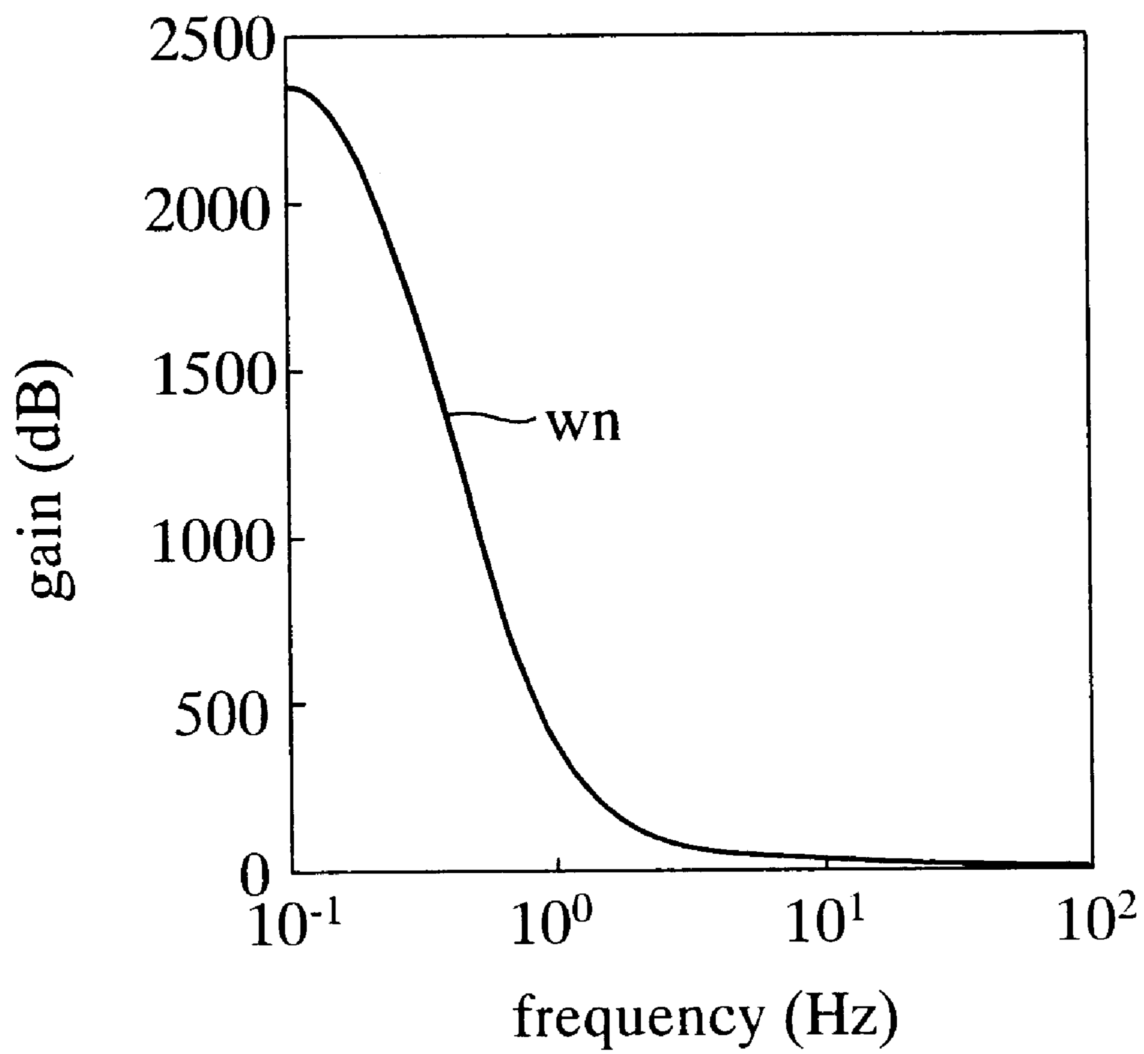
FIG. 15 shows a graph indicating a gain characteristic of the weight function wn shown in FIG. 14 depending on frequency.

The motor rotation speed Nm corresponds to the integration from the time before the predetermined time that the SR Motor 11 is started to generate the rotational torque. Even if the rotational torque is zero, the motor rotation speed Nm is not immediately zero but keeps a constant speed. (Hereinafter, the constant speed is called a steady-state component.) On the other hand, the actual plant model is designed to be linear near the resonance frequency. To improve the control performance of the closed loop system, the steady-state component needs to be eliminated. Thus, in order to eliminate both the sensor noise and the steady-state component contained in the rotation speed Nm, the sensor noise and the steady-state component are described by a weight function wn. The weight function wn is determined and output into a point between the actual plant model psys and the controller K as shown in FIG. 14. The gain of the weight function wn is determined to be large in a low frequency domain. The point to be outputted by the weight function and the gain of the weight function is determined based on the steady-state component influencing the closed loop system more than the sensor noise and that the steady-state component becomes large in the low frequency domain.

Figure 4:
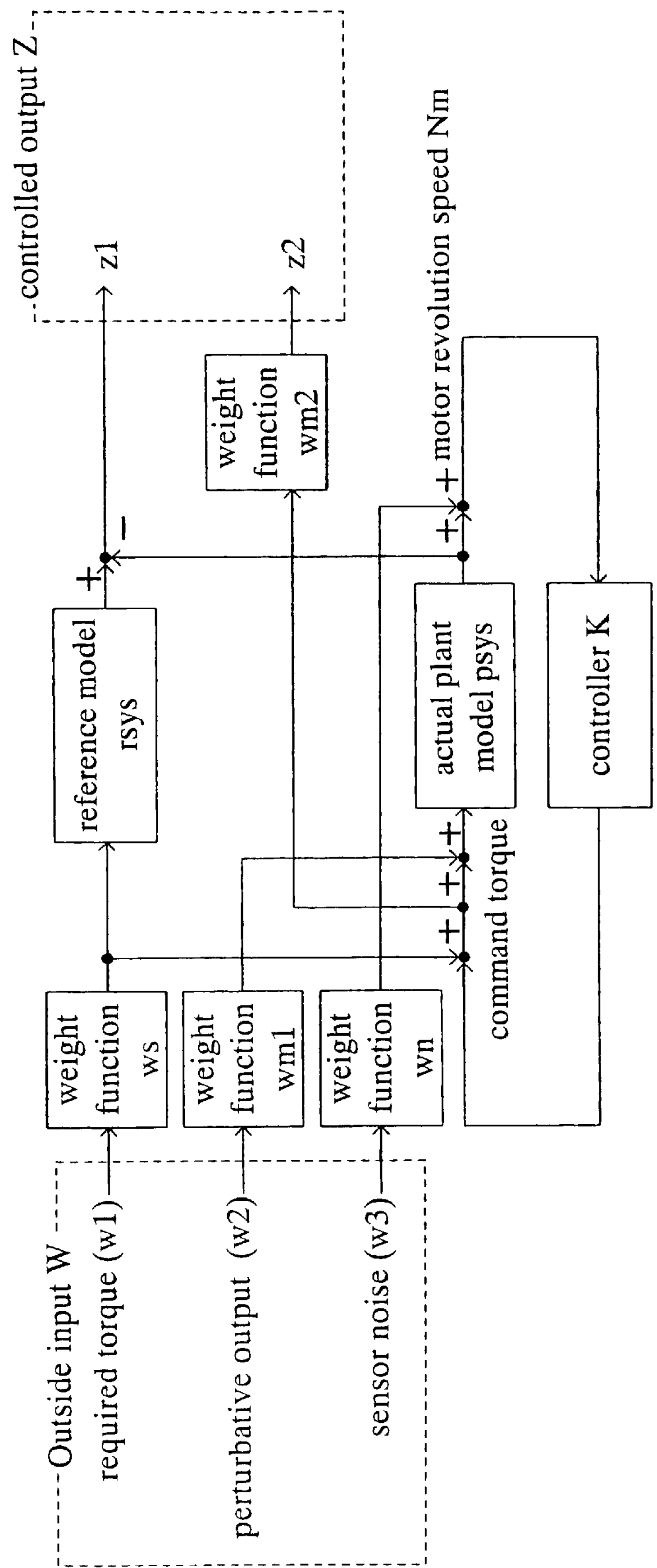
FIG. 4 shows a flow chart of process to determine a controller of the electric motor control device in FIG. 1 by H∞control.
Figure 5:
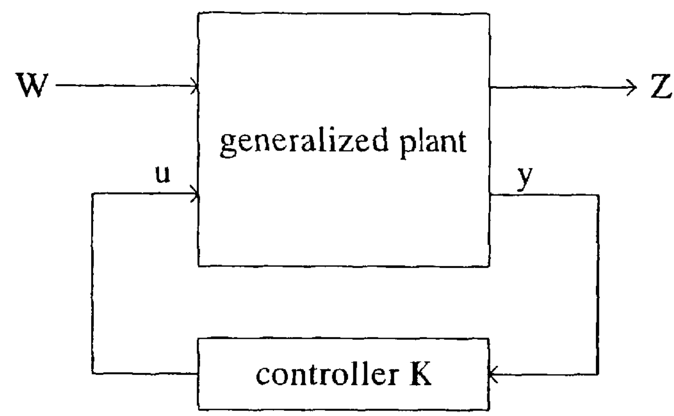
FIG. 5 shows a generalized plant of H∞control.

The generalized plant constructed to satisfy whole above-mentioned specification is shown in FIG. 4. In the generalized plant, the outside input W is composed of the required torque w1, the perturbative output w2 and the sensor noise w3. The controlled output Z is composed of the controlled outputs z1 and z2. For executing a feed-back control for the generalized plant is executed by the controller K, the controller K is determined as the H∞norm of the transfer function Tzw determined the relation between the outside input W and the controlled output Z to be smaller than 1 in order to guarantee the stability of the closed loop system. The determination of the controller K having the above H∞norm is equivalent to the H∞control problem in this embodiment.

As solutions for the above the H∞control problem, two ways can be taken. The first way is solving Riccati equation. And the other way is solving LMI problem that the Riccati equation is transformed into from the equality to the inequality. In this embodiment, the controller being 14th order was designed by using MATLAB.

Since the controller designed by above way is a higher order, the high order of the controller needs to be reduced to load and execute on an actual microcomputer. The controller being of high order brings a higher operational load to the microcomputer, and thus the microcomputer cannot terminate the operation during a predetermined period. In this embodiment, first, 14th order of the determined controller was reduced to 6th order. Next, the controller being the reduced order was transformed to discrete form. Accordingly, the feed-back correction shown in Formula 1 was obtained in the controller.

$$U(k)=\sum_{i=1}^{n} ai\cdot u(k-i)+\sum_{i=0}^{n} bi\cdot Nm(k-i) \qquad \text{Formula 1}$$

FIG. 16 shows a flow chart indicating steps of design process for the above-mentioned controller K. The steps are briefly described as follows. At step S1, the identification examination is performed, and the design process proceeds to step 2. At step S2, the parameters of the actual plant model are identified with the examination results of step S1 by the frequency fitting. Thus, the actual plant model psys is derived based on the parameter, and then the design process proceeds to step S3. At step S3, the reference model rsys is derived referring to the actual plant model obtained at Step S2. Then the design process proceeds to step S4. The characteristic variation on account of the torque ripple generated by switching the electric current of the SR Motor 11 and on account of the driving conditions and the types of vehicles is derived, and the design process proceeds to step S5. At step S5, the characteristic of noises included in components of the rotation speed Nm is derived. The design process proceeds to step S6, and the weight function ws, wm1, wm2, and wn are determined based on the characteristic variation and the characteristic of the noises included in the rotation speed Nm. At step S7, the generalized plant shown in FIG. 4 is composed. At step S8, the controller K for the generalized plant is obtained or founded by using MATLAB. At step S9, the control performance of the controller K is evaluated by judging whether the performance satisfies a prepared evaluation condition or not. If the performance of the controller K is determined to not satisfy the evaluation condition, the design process proceeds from step S6 to S8 again. If the performance satisfies the evaluation condition, the design process proceeds to step S10. The order of the controller K is then reduced. Then the design process proceeds to step S11, where the controller is transformed to the discrete form.

Figure 17:
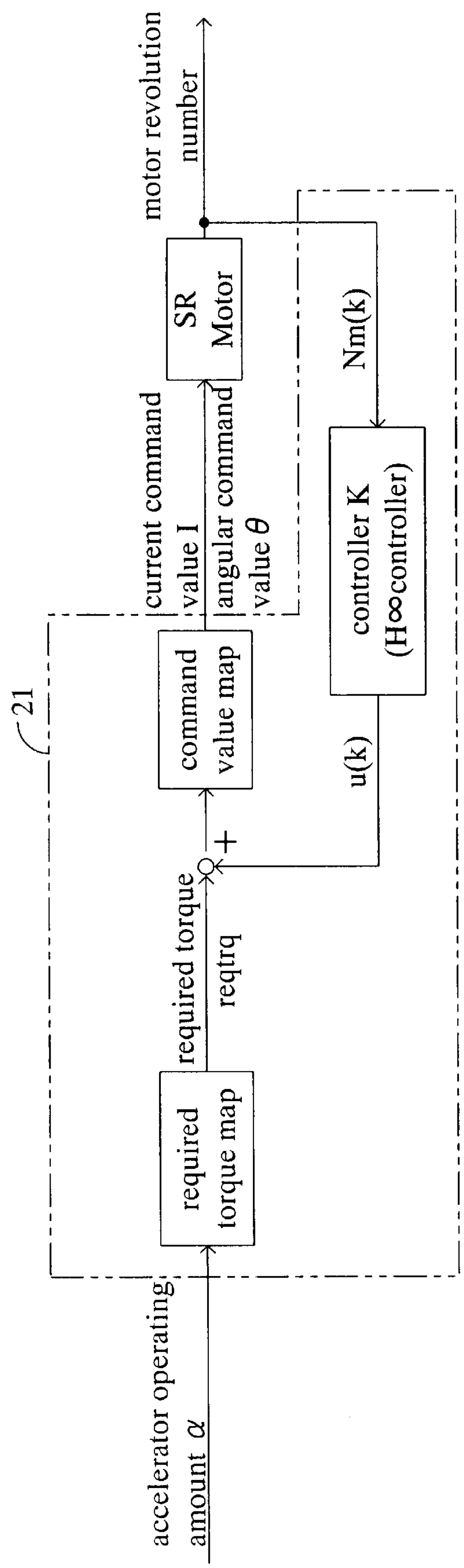
FIG. 17 shows a block diagram of the controller K (an H∞controller) loaded on the microcomputer shown in FIG. 1.

FIG. 17 shows a block diagram for the processes of the microcomputer 21. On the microcomputer 21, the controller K is loaded and executed, and the order was reduced. In the microcomputer 21, the accelerator operating amount a from the accelerator operating amount sensor 27 is inputted. First, the accelerator operating amount α is converted to the required torque reqtrq referring the required torque map shown in FIG. 3. Next, the required torque reqtrq is converted to the current command value I and the angular command value θ based on the command value map (not shown). Then the microcomputer 21 brings the electric current depending on the current command value I and the angular command value θ to the SR Motor 11. On the other hand, the motor rotation speed Nm (k) is further inputted to the controller K in the microcomputer 21. The correction u (k) is calculated by the controller K and added to the required torque reqtrq to be converted.

Hereinafter, the actual operation by the CPU 21*a* when the above control is performed will be described based on a program corresponding to the flowchart in FIG. 18. A power switch (starting switch) of the electric vehicle (not shown) is turned from OFF to ON, and then the program is loaded on the CPU 21*a* and the program proceeds from step 100 to step 105. At step 105, the initialization is performed by the CPU 21*a*, and the program proceeds to step 110. At step 110, the program judges whether a predetermined time has (10 m sec) elapsed or not. If predetermined time has elapsed, the CPU 21*a* judges "YES" at step 110, and the program proceeds to step 115. At step S115, the CPU 21*a* calculates the required torque reqtrq based on the actual accelerator operating amount α and the required torque map shown in FIG. 3. The program proceeds to step 120, where the CPU 21*a* detects the motor rotation speed Nm based on the signal transferred from the resolver 28. The program proceeds to the next step S125, and calculates the correction u (k) as the feed-back value or correction.

Figure 18:
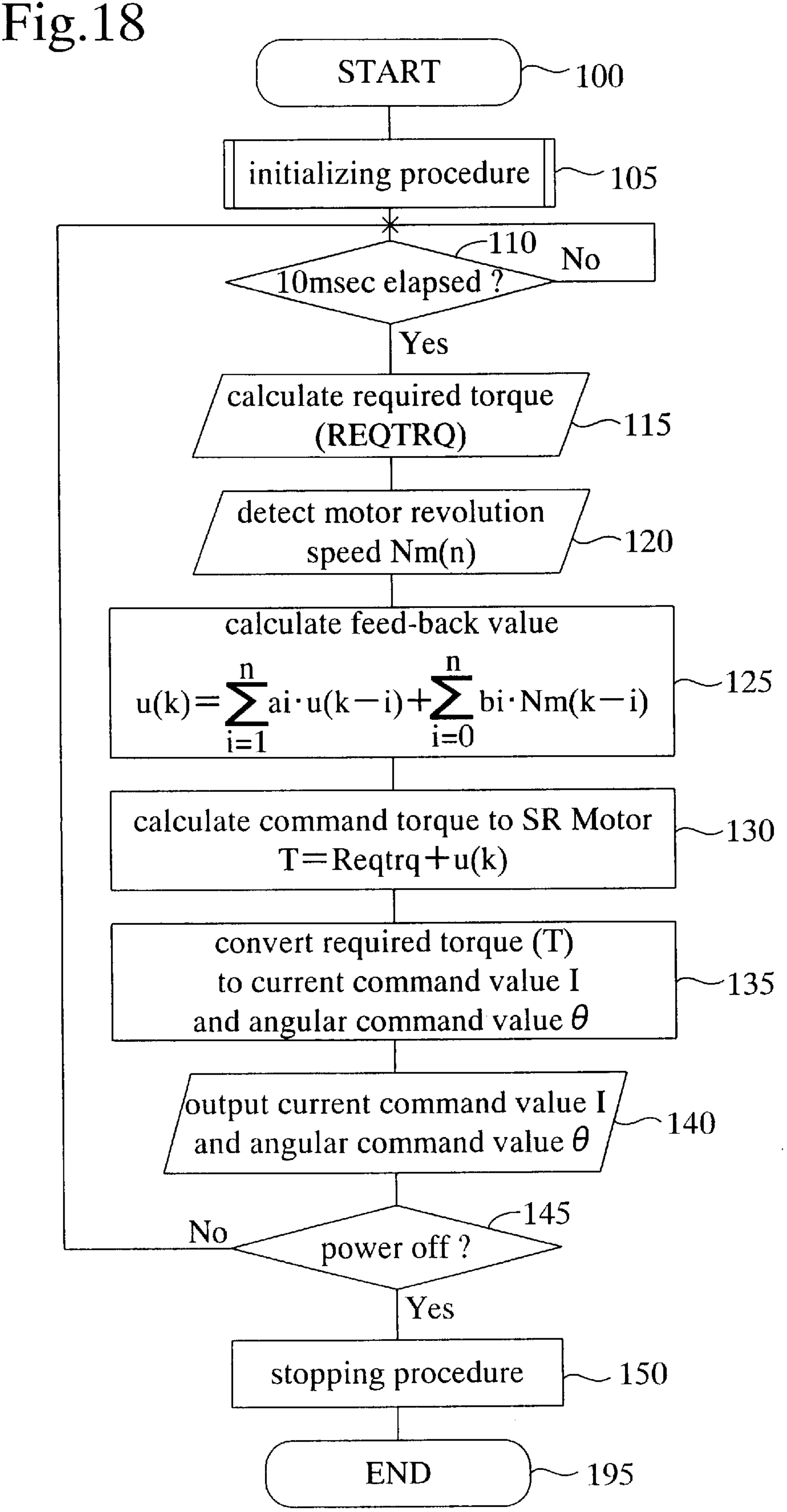
FIG. 18 shows a flow chart of a program executed by the microcomputer shown in FIG. 1.
Figure 19:
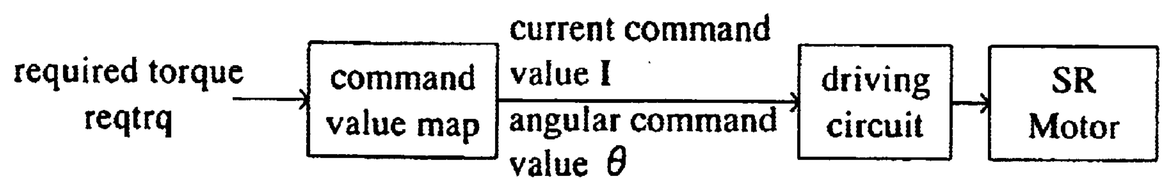
FIG. 19 shows a block diagram of a control system for a conventional SR Motor.
Figure 20:
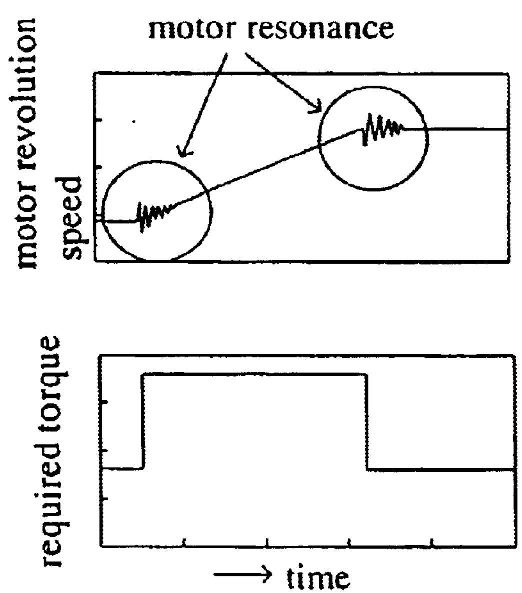
FIG. 20 shows a time chart indicating variations of the required torque and rotation speed of the electric motor in the control system shown in FIG. 19.

The correction u (k) here means the correction calculated at step 125 in a series of k th operation in a main loop (steps 110 to 145) of the flowchart in FIG. 18. And the motor rotation speed Nm (k) here also means the motor rotation speed Nm detected by the CPU 21*a* in the series of k th operations in the main loop. Thus, the correction u (k-i), the motor rotation speed Nm (k-i) means the correction u and the motor rotation speed Nm obtained in the series of i times before operation in the main loop.

Then the program proceeds to step 130, where the CPU 21*a* calculates the required torque T based on following formula 2.

$$T=REQTRQ+u(k) \quad \text{Formula 2}$$

The program proceeds to step 135, then the resulting command torque T is converted based on the command value map (not shown) to the current command value I and the angular command value θ by the CPU 21*a*. The program proceeds to step 140, where the microcomputer 21 outputs the current command value I and the angular command value θ to the chopper circuit 22.

The electric current corresponding to the current command value I flows in the SR Motor 11 at a schedule corresponding to the angular command value θ through the chopper circuit 22 driving circuit 23 and the switching circuit 24.

The program proceeds to step 145, l where the CPU 21*a* judges whether the power switch is turned off or not. If the power switch is not turned off, the CPU 21*a* judges "No" at step 145, and then the program goes back to step 110. If the power switch is turned off, the CPU 21*a* judges "Yes" at step 145, and then the program proceeds to step 150. The CPU 21*a* operates a stopping operation at step 150. After the stopping operation, the program proceeds to step 195, and thus all operations in the program are terminated.

By the above-mentioned operations, the required torque reqtrq is determined by accelerator operating amount α. The command torque T is determined by correcting the required torque reqtrq with the correction u (k) (feed-back value or correction). The electric current is supplied to the SR Motor 11 depending on the required torque reqtrq.

In the electric motor control device in this embodiment, the electric motor control device wherein the response of the SR Motor 11 is closed to the reference model having the ideal vibration reduction and the ideal response. The electric motor control device can reduce the negative effects of the noise with the operation of the resolver (rotation speed detecting means), and is excellent in robust stability against the characteristic variation caused by the torque ripple and the driving conditions and the types of vehicles. Furthermore, the electric motor control device may be applied to control another type electric motor, may be applied in another device except the electric vehicle.

What is claimed is:

1. An electric motor control device comprising:

a controller determined by forming a reference model having ideal tracking performance and vibration reduction performance relative to a required torque in response to an operation amount of an electric motor, forming an actual model indicating an actual response of the electric motor relative to the required torque, obtaining a first rotation speed of the electric motor calculated by inputting the required torque to the reference model, obtaining a second rotation speed of the electric motor calculated by inputting the required torque to the actual model, obtaining a rotation speed difference as a difference between the first rotation speed and the second rotation speed, and determining an H∞norm of a transfer function between the required torque as an input amount and the rotation speed difference as an controlled amount to be smaller than a predetermined value, wherein an electric current to be supplied to the electric motor is controlled in response to a command torque obtained by correcting the required torque by a correction amount calculated by the controller based on the actual rotation speed of the electric motor.

2. The electric motor control device in accordance with claim 1, wherein the controller is determined based on a system in which the required torque is inputted to both the reference model and the actual model through a first weight function.

3. The electric motor control device in accordance with claim 2, wherein a gain of the first weight function in a low frequency domain is determined to be larger than a gain in a high frequency domain.

4. The electric motor control device in accordance with claim 1, wherein a gain of the reference model is determined to be smaller than a gain of the actual model in a frequency domain near a resonance frequency of the actual plant model, and wherein the gain of the reference model is determined to be approximately equal to the gain of the actual model in a remaining frequency domain.

5. The electric motor control device in accordance with claim 1, wherein, the varying response of the electric motor as an actual response variation is determined by a multiplicative perturbation, and wherein a perturbative output outputted from the multiplicative perturbation is inputted to the actual model through a second weight function and then a second controlled amount is outputted by the controller through a third weight function, and wherein the controller is determined as an H∞norm of the transfer function between 1) the required torque and the perturbative output and 2) the rotation speed difference and the second controlled amount is smaller than the predetermined value, and wherein the controller controls the electric current to be supplied to the electric motor.

6. The electric motor control device in accordance with claim 5, wherein the gain of the second weight function is determined to be larger in the high frequency domain than in low frequency domain, and wherein the gain of the third weight function is determined to be larger in the high frequency domain than in low frequency domain.

7. The electric motor control device in accordance with claims 5, wherein a sensor noise is added to the input amount of the controller through a fourth weight function, and wherein the controller is determined as the H∞norm of the transfer function between the perturbative output and the sensor noise processed through the fourth weight function and the rotation speed difference and the second controlled amount is smaller than the predetermined value, and wherein then the controller controls the electric current to be supplied to the electric motor.

8. The electric motor control device in accordance with claim 7, wherein the gain of the fourth weight function is determined to be larger in a low frequency domain than in a high frequency domain.

* * * * *